United States Patent [19]
Alvarez et al.

[11] 3,720,041
[45] March 13, 1973

[54] PROCESS FOR DRYING METHYL CHLORIDE IN A POLYMER PLANT

[76] Inventors: Jose A. Alvarez, 10301 H Malcom Circle, Cockeysville, Md.; Edward F. Upchurch, 59 Keats Road, West Millington, N.J.

[22] Filed: Dec. 8, 1971

[21] Appl. No.: 205,787

[52] U.S. Cl. .................................. 55/29, 55/71
[51] Int. Cl. ................................... B01d 53/14
[58] Field of Search .............................. 55/29–33, 71; 260/85.3, 94.9 F, 94 R, 96 R, 681.5

[56] References Cited

UNITED STATES PATENTS 3,005,808  10/1961  Kerrey et al. ..................... 260/85.3

Primary Examiner—Charles N. Hart
Attorney—Leon Chasan et al.

[57] ABSTRACT

A process for drying methyl chloride in a butyl rubber process using glycol is improved by presaturating the glycol with liquid methyl chloride thereby avoiding temperature increases during presaturation. Need for a glycol-methyl chloride cooler is thereby eliminated. Since the absorber operates at a lower temperature, drying of the methyl chloride stream is more complete.

8 Claims, 2 Drawing Figures

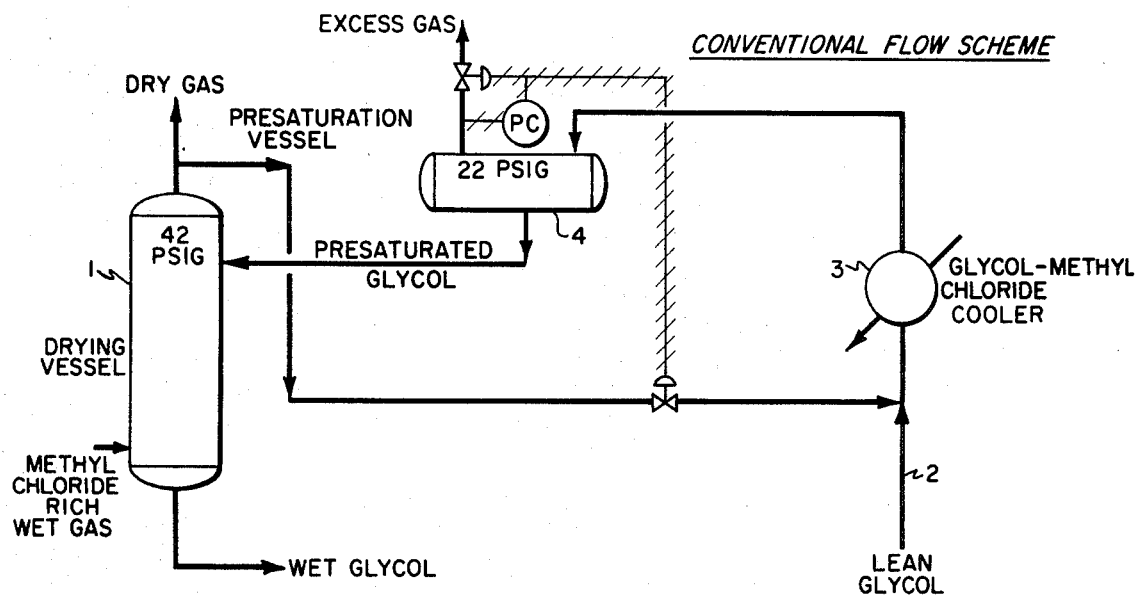
Fig. I
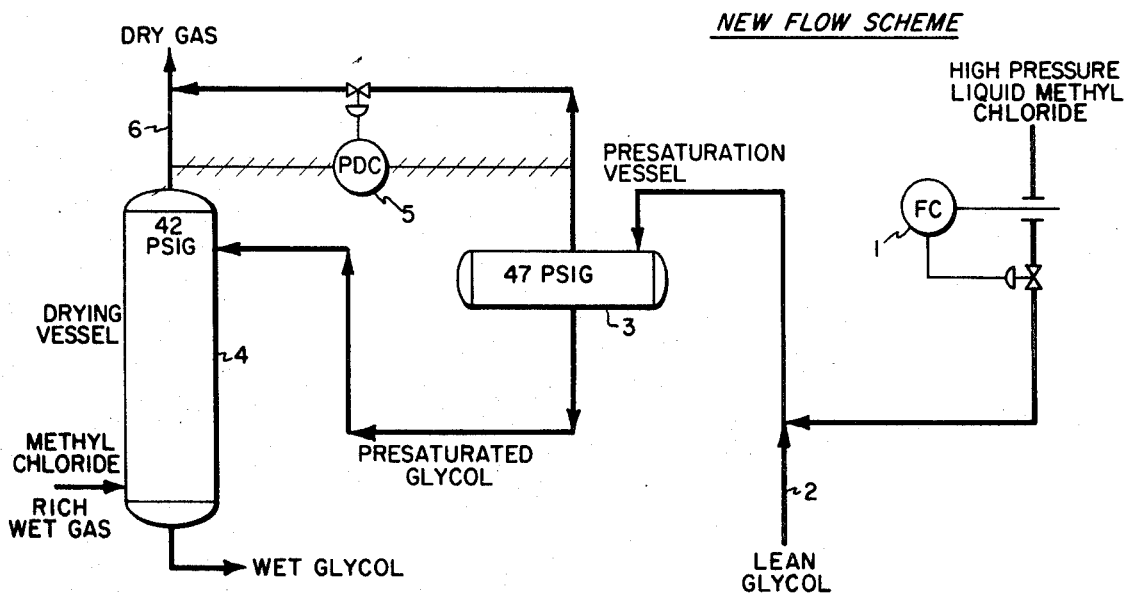
Fig. II

PROCESS FOR DRYING METHYL CHLORIDE IN A POLYMER PLANT

BACKGROUND OF THE INVENTION

In the preparation of butyl rubber a stream is formed overhead in the flash drum by vaporization of the reactor effluent overflow slurry stream. The flash gases contain the diluent methyl chloride, unreacted hydrocarbon monomers, and water vapor. In the past, this stream has been compressed, dried, fractionated, and returned to the reactor as recycle monomer and diluent. However, it has been found that the alumina driers which remove the water in this stream become saturated in a relatively short time, e.g. 24 hours. Therefore, the saturated alumina drier must be frequently replaced and regenerated; but these operations are expensive and time consuming.

Furthermore, it has been noted that polymerization poisons are formed during the preparation of butyl rubber polymer. These poisons are hydrolysis products of methyl chloride and water, e.g. alcohols and ethers. It should be noted that most of these poisons are produced in the zones in which water is present in large concentrations. These zones are the flash tank, the first stage recycle gas compressor system, and the alumina driers. Moreover alumina is an exacting catalytic agent for promoting hydrolysis.

A method whereby the life of an alumina drier can be extended substantially for longer periods of time, e.g. 5 days or more, is fully described in U.S. Pat. No. 3,005,808. This method now makes it possible to also remove a considerable amount of nefarious molecular weight poisons from the recycle monomer and diluent streams. In one embodiment of the invention, described in the aforesaid patent, the recycle system from the flash tank is compressed and cooled and subsequently treated with glycol solution; and then passed through alumina driers. Contacting of the methyl chloride stream with glycol takes place in a glycol absorption tower. It is necessary to regenerate the glycol which leaves the absorption tower since this stream now contains quantities of water, the aforementioned catalyst poisons, and dissolved methyl chloride.

The efficiency of the glycol drying unit is impaired by the generation of heat of solution of methyl chloride in the glycol. An attempt to offset this effect has incorporated the introduction of gaseous methyl chloride into the glycol followed by cooling of the presaturated glycol stream.

SUMMARY OF THE INVENTION

It has now been found that the need for the glycol methyl chloride cooler may be eliminated by presaturating the glycol with a liquid methyl chloride.

Increasing the saturation level of MeCl in glycol minimizes heat effects in the absorption vessel thus improving drying effectiveness. Complete saturation of the glycol stream is assured by maintaining a pressure differential between the presaturation vessel and the drying vessel constant. Over saturation is prevented by limiting the pressure differential from about 1 to about 10 psig.

BRIEF DESCRIPTION OF THE DRAWING

FIG. 1 is a schematic diagram of the prior art flow stream of glycol drying of methyl chloride.

FIG. 2 is a schematic diagram of the glycol drying system of the instant invention.

DETAILED DESCRIPTION

Butyl rubber is prepared by reacting 70 to 99.5 parts by weight, preferably 85 to 99.5, of an isoolefin with about 30 to about 0.5 parts by weight, preferably about 15 to about 0.5, of a multiolefin. The isoolefin in general is a $C_4$ to $C_7$ compound, e.g., isobutylene or 2-methyl-1-butene. The multiolefin is generally a $C_4$ to $C_{10}$ conjugated diolefin, e.g. isoprene, butadiene, or piperylene. The third polymer is obtained by reacting 95 to 99.5 weight percent of isobutylene with about 0.5 to 5 percent by weight of isoprene.

The mixture of monomers, preferably with 1 to 5 volumes of inert diluent, e.g. methyl chloride, should be cooled to temperatures of about 0° to −200°C. and it is preferred that the temperature range be about between −60° and −130°C. The cold mixture is polymerized by the addition of a Friedel-Crafts catalyst, preferably an aluminum halide catalyst in a liquid or dissolved form, in conjunction with vigorous agitation. The amount of catalyst is generally about 0.02 to about 0.5 percent by weight of the admixed olefins.

The polymerization reaction is rapid and the polymer precipitates additive solution in the form of slurry or flocculent white solid. The polymer which is recovered in the flash tank and dried, has a Staudinger molecular weight between about 30,000 and 150,000 preferably 40,000 to 60,000; and an iodine number of about 0.5 to about 50, preferably between 1 and 15. The preparation of this copolymer is described in U.S. Pat. Nos. 2,455,665; 2,356,128; and 2,611,751 which are incorporated herein by reference. The butyl rubber also within the scope of this invention includes those which are halogenated, e.g. chlorinated and brominated; preferably the range of halogen in the rubber structure is about 0.9 to 1.5 wt. percent for chlorinated butyl rubber and about 0.15 to about 3.0 and about 1.5 3.0 wt. percent for brominated butyl rubber.

Methods of treating recycled gas (methyl chloride) and butyl rubber processes are described in U.S. Pat. No. 3,005,808 incorporated herein by reference. These techniques involve scrubbing the recycle gas in a glycol absorption tower. From the overhead in the flash drum is provided a stream comprising about 90 to about 98.0 methyl chloride and about 0.4 to about 1 percent water, 1.0 to 15.0 percent unreacted hydrocarbons and traces of polymerization poisons.

After the stream has passed through a series of coolers, knock-out drums and compressors, it is treated with a glycol solution in the absorption tower. About 1 to 10 gallons of glycol solution are provided for every pound of water entering the tower in the recycle stream and about 99 percent of the water in the feed and some of the polymerization poisons are absorbed therein. Although any alkylene or polyalkylene glycols may be used in the practice of this invention, it is preferred to use an ethylene glycol, di- or triethylene glycol. Other glycols which may be used include propylene glycol, polypropylene glycol, trimethylene glycol, pentaglycol, butylene glycol, tetramethylene glycol, 1,3-butane diol, methyl pentane diol, pentane diol, 3-methyl-1,3-butane diol, pinacol, 2-methyl-2,4-pentane diol, etc.

It is also in the purview of this invention to replace parts of the glycol with an amine. Preferred amines are mono-, di- and tri- alkanol amines but the especially-preferred compounds are mono-, di- and tri- ethanol amines. A glycol amine solution generally comprises about 10 to 30 wt. percent of amine and 65 to 89.5 percent of the glycol. More preferably, the amine content is about 15 to 25 wt. percent; the glycol-amine solution, e.g. 20 wt. percent.

The advantages of this invention may be more readily appreciated by comparison with the prior art method of glycol drying.

Referring now to FIG. 1, the prior art method of glycol drying of methyl chloride rich wet gases, dry methyl chloride gas taken from the overhead of the glycol drying vessel, 1, (absorption tower) is mixed with a lean glycol stream, 2, and subsequently fed into a glycol-methyl chloride cooler, 3, to remove the heat of solution. This cool stream is then fed to a presaturation vessel, 4, and subsequently to the drying column. Wet glycol is removed from the bottom of the drying vessel and dried gas comes off in the overhead stream.

In the prior art method described, the glycol is not completely saturated with methyl chloride before entering the absorber. As a consequence the potential for water absorption is reduced by the further absorption of methyl chloride by the glycol thereby increasing its temperature.

Referring now to FIG. 2, the advantages of the instant invention are readily apparent. High-pressure liquid methyl chloride is fed through a flow control valve, 1, and mixed with a lean glycol stream, 2, and sent to a presaturation vessel, 3. The heat of solution is dissipated by evaporation of a portion of the methyl chloride. This presaturated glycol is then fed to the drying vessel, 4. In order to assure complete saturation of the glycol solution, a constant pressure differential is maintained between the presaturation vessel, 3, and the drying vessel 4, the drying vessel being at a lower pressure. This pressure differential is maintained by use of pressure differential control valve 5, which permits the flow of methyl chloride from the presaturation vessel, 3, to the overhead line, 6, of the drying vessel, 4. Hence, it is obvious that a primary advantage of this invention is the elimination of the glycol methyl chloride cooler from the glycol drying system at a substantial saving in economics. Additionally, since the drying vessel operates at a lower temperature in the process of this invention, drying of the methyl chloride is more complete.

The pressure differential between the presaturation vessel and the drying vessel is preferably about 2 to about 10 psi, the presaturation vessel being maintained at the higher pressure. More preferably the pressure differential is about 3 to 6, e.g., 5 psi.

The presaturation vessel is maintained at a pressure slightly above the vapor pressure of the methyl chloride over triethylene glycol solution, preferably about 1 to 10 psi higher — more preferably about 2 to about 6 psi, most preferably, e.g. 5 psi.

Although the invention has been described in terms of saturating the glycol with liquid methyl chloride, it is obvious to those skilled in the art that the process of this invention may be carried out by saturation of the glycol with gaseous methyl chloride. In that event, however, cooling of the saturated glycol is required.

The pressure in the absorber is a function of the manner in which the overall butyl rubber process in operated. The pressure may be about 25 to about 75 psig. Typically, it is about 25 to about 50 psig. The temperature of the glycol is typically about 85 to about 100°F., e.g. about 95°F.

What is claimed is:

1. In a process for preparing butyl rubber, wherein the diluent stream is fried by contacting said diluent stream with a glycol in an absorption tower, the improvement which comprises:
   a. presaturating the glycol stream with liquid methyl chloride;
   b. storing the presaturated glycol in a presaturation vessel; and
   c. maintaining a constant pressure differential between the absorption tower and the presaturation vessel, said presaturation vessel being at about 1 to about 10 psi higher than said absorption tower.

2. The process of claim 1 wherein the absorption tower pressure is about 25 to about 75 psig.

3. The process of claim 1 wherein the pressure differential between the absorption tower and presaturation vessel is about 2 to about 6 psi.

4. The process of claim 3 wherein the pressure differential is about 5 psi.

5. The process of claim 1 wherein the glycol is triethylene glycol, diethylene glycol or ethylene glycol.

6. The process of claim 5 wherein the glycol is triethylene glycol.

7. The process of claim 1 wherein the glycol stream comprises about 10 to about 30 wt. percent of an alkanolamine.

8. The process of claim 1 wherein the alkanolamine is triethanolamine.

* * * * *